Dec. 5, 1939.   M. B. BOOTH   2,181,962
ROTARY ENGINE
Filed June 30, 1936   3 Sheets-Sheet 1

M. B. Booth,
Inventor.

Dec. 5, 1939.  M. B. BOOTH  2,181,962
ROTARY ENGINE
Filed June 30, 1936  3 Sheets-Sheet 2
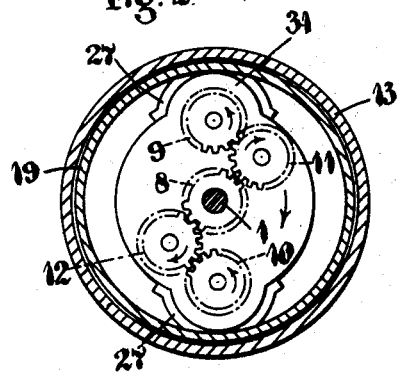
Fig. 2.
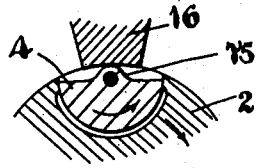
Fig. 14.
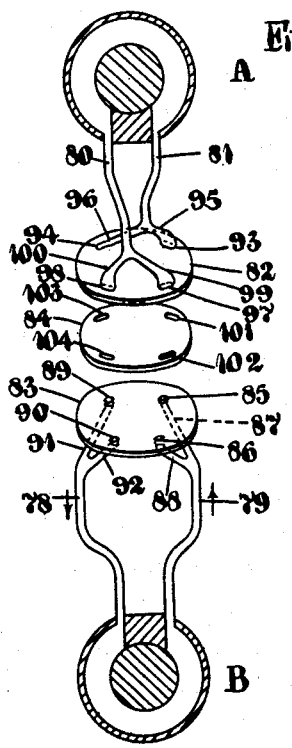
Fig. 15.
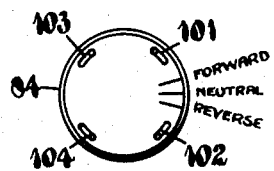
Fig. 16.
Fig. 17.
Inventor.
M. B. Booth,
By
Attorneys

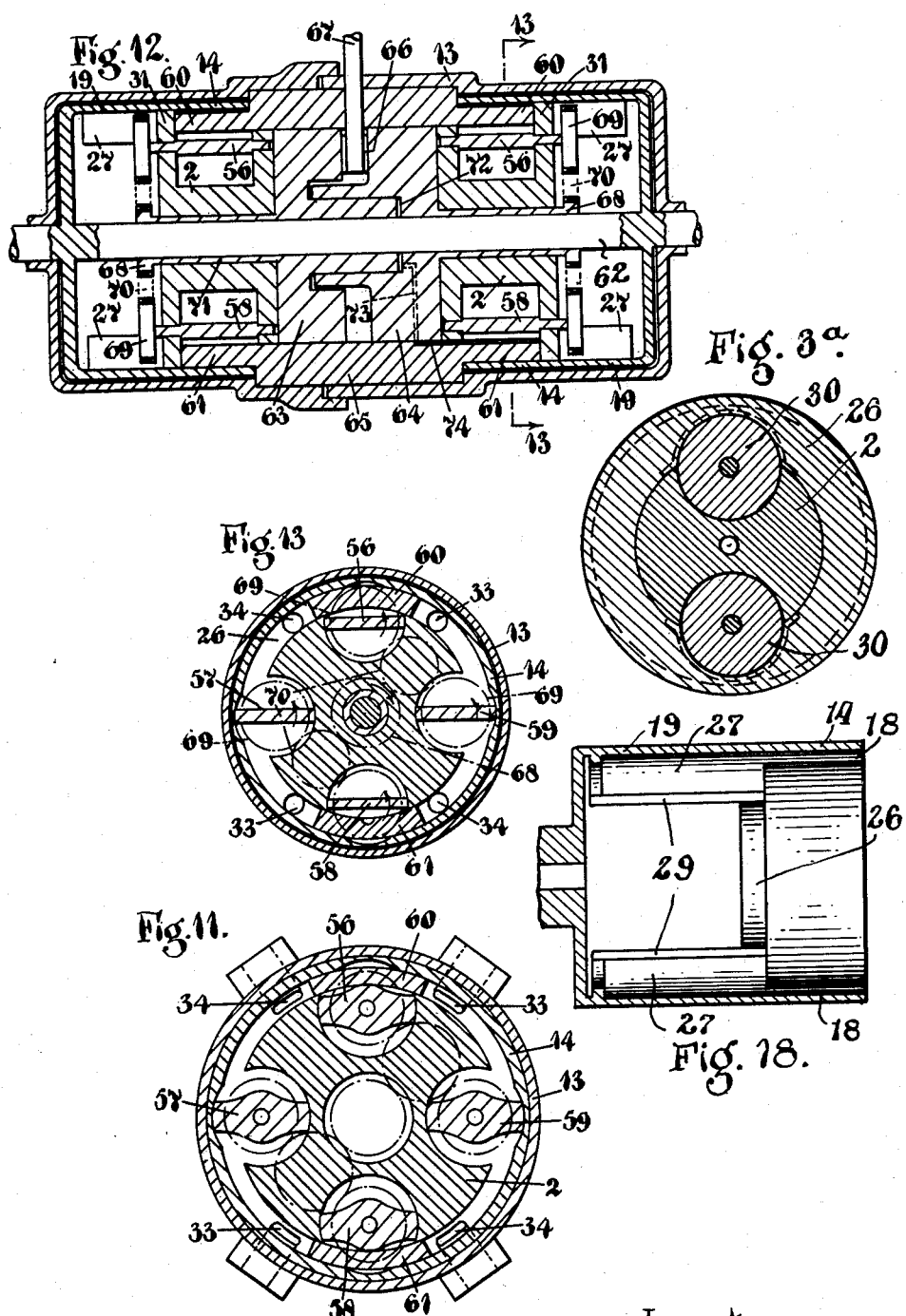

Patented Dec. 5, 1939

2,181,962

UNITED STATES PATENT OFFICE 2,181,962

ROTARY ENGINE

Melville Bertram Booth, Allesley, Coventry, England, assignor to The Keelavite Company Limited, Allesley, Coventry, England Application June 30, 1936, Serial No. 88,231
In Great Britain July 6, 1935

23 Claims. (Cl. 103—143)

This invention concerns rotary engines operated by or operating upon a fluid medium, hereinafter referred to as the operating fluid of the engine, it being understood in this connection that this term "operating fluid" is used herein with reference both to a driving fluid, that is, a liquid or gaseous power supplying or power conveying medium for driving the engine, and also to a driven fluid as in the case, for example, of a pump, transmission device or the like.

The principal object of the invention is to provide an improved construction of rotary engine characterised by a high order of efficiency in the operation of the engine, for reasons hereinafter set forth, especially when operating with or upon gaseous or other low viscosity operating fluids, the engine being at the same time of relatively low cost of manufacture as compared with known forms of engines of the same general class in the art.

With this principal object in view, the invention consists according to its broadest aspect in a rotary engine having an annular blade chamber enclosed between two relatively rotatable concentric members, one of which carries the opposed peripheral walls of the chamber in stationary relationship, in the sense of rotation, to one another, and the other at least one fixed abutment extending across the chamber, and peripherally part-circular blades which during the relative rotation of the members rotate continuously in pockets in one of the peripheral walls of the chamber and at the same time sweep arcuate channels concentric with them in the other peripheral wall, the blades effecting where they are circular at the periphery a sealing fit with the pockets and also with a fine clearance with the channels, at all times during the relative rotation of the members except upon relative passage past an abutment when in the course of their rotation in the pockets they recede thereinto to effect the passage.

It will be understood, of course, that the axial channels in the channelled wall of the blade chamber are distinguished from the pockets in the pocketed wall in that, whereas these pockets are virtually housings for the blade, the channels referred to simply seal with the periphery of the blade.

It will also be understood that either of the relatively rotatable concentric members of the engine may be the rotor and the other member the stator, from which it will be further understood that in stating in the foregoing definition of the invention that the opposed peripheral walls of the blade chamber are carried in stationary relationship, in the sense of rotation, to one another, it is meant that in the case where the member which carries these walls is the rotor of the engine, the said walls are rotatable in unison with one another, while in the opposite case where the member which carries the said walls is the stator of the engine, the walls are both stationary in the engine.

With the improved construction of rotary engine in accordance with the invention, as set forth above, area-sealing is provided for, as opposed to line-sealing (or sealing at one point only of the circular sealing surface of the blade) as between the blades and the channelled wall of the blade chamber, with consequent enhanced efficiency of the engine and with possibility, moreover, of dispensing, even in the case of engines designed to operate with or upon a gaseous or other relatively non-viscous operating fluid, with a high order of fineness in respect of the sealing fit clearances. In addition, in the event of the channels in the channelled wall of the blade chamber being, as they conveniently may, bored out in the one boring with the pockets in the pocketed wall, for example as when, in accordance with a feature of the invention, the part forming the channelled wall and the part forming the pocketed wall are in one integral piece, such a high order of precision or accuracy in the centering of the borings as is essential in the known forms of engine (on account of the fact that in the said known forms, the wall of the blade chamber opposite to the pocketed wall thereof is upon the member of the two relatively rotatable members from which the abutment or abutments extends or extend into the chamber, and, therefore, the surface of the blade chamber wall with which the sealing surfaces of the blades—that is, the circular parts of their peripheries whereat they seal with the pockets in the pocketed wall and at the same time with the said opposite wall—effect a sealing fit, is upon a part which is a separate part from the part carrying the blades) is rendered unnecessary, for the requisite accuracy of centering of the surfaces in the channelled wall of the blade chamber whereat sealing is effected with the blades, namely the surfaces of the channels therein, for proper sealing fit as between these surfaces and the blades, is automatically secured.

The invention further consists in certain particular constructions of rotary engines embodying the foregoing principal feature of the invention in such a manner, characterised, as will be apparent, by extreme simplicity coupled with efficiency in the operation of the engine, as will result in the various moving parts being inherently balanced against the thrust upon them of operating fluid in the blade chamber.

The invention also consists in a rotary engine of the said improved construction as set forth above, wherein, in the case where there are two or more abutments, the arrangement is one in which the blades are formed with a corresponding number of sealing surfaces separated around the periphery of the blade by a similar number of non-sealing surfaces and are rotatable around their own axes once relatively to the recessed member per revolution of the latter relatively to the other member. An important advantage of this arrangement, as compared with the case where the blades are provided with only one sealing surface, is that a smaller blade revolution speed is necessary for a given speed of relative rotation of the recessed member and in consequence strain and wear and tear of the gears and bearings of the engine is reduced; also, much thinner blades may be employed, for example, blades whereof the width at the sealing surface is a relatively small fraction only of the diameter of the blade, it only being necessary to make the width of the channels in the periphery of the blade chamber sufficiently greater than the said width of the blades to ensure the desired or necessary arc of effective sweep of the blade around the blade chamber and also the necessary timing of the commencement and termination of this arc relatively to the movement of the blade around the chamber.

The invention will now be further described with reference to the accompanying drawings, which illustrate a number of embodiments and which, as will be understood, are largely diagrammatic.

In the drawings,

Figure 1 is an axial section through one form of single-abutment two-bladed engine in accordance with the invention, the engine embodying means for varying its capacity, in accordance with the invention forming in part the subject matter of co-pending application Serial No. 69,571, filed March 18, 1936.

Figures 2, 3, 4 and 5 are, respectively, cross-sections on the section lines 2—2, 3—3, 4—4 and 5—5 of Figure 1;

Figures 6 and 7 are, respectively, an axial section and a cross-section through another form of rotary engine in accordance with the invention, this form also embodying the feature of means for varying the capacity of the engine;

Figure 8 is a diagrammatic axial section through an engine generally similar to the engine shown in Figures 1 to 5, illustrating a modification hereinafter described;

Figure 9 is an axial section through a double-chambered engine devoid of means for varying the capacity of the engine;

Figure 10 is an axial section and Figure 11 a cross-section through another construction of double-chambered engine, generally similar in principle to the engine of Figure 9, but constructed with four double-sided blades and two abutments.

Figure 12 is an axial section, and Figure 13 a cross-section, through a form of double-chambered engine, constructed with double-sided blades and embodying the feature of means for varying the capacity of the engine and the feature according to which the whole of the rotating parts of the engine are balanced both axially and radially;

Figure 14 is a fragmentary cross-section through one of the blades of the engine as it is passing an abutment, showing a modified form of seal, hereinafter described, as between the blade and the abutment;

Figures 15 and 16 are diagrammatic views of a form of valve gear which may be employed in conjunction with two rotary engines in accordance with the invention coupled together for operation one as a pump and the other as a motor to form a power transmitting unit, and Figures 17 and 18 are fragmentary views illustrating certain constructional details hereinafter more particularly described.

Like reference characters in the various figures of the drawings denote like parts.

Figure 1:
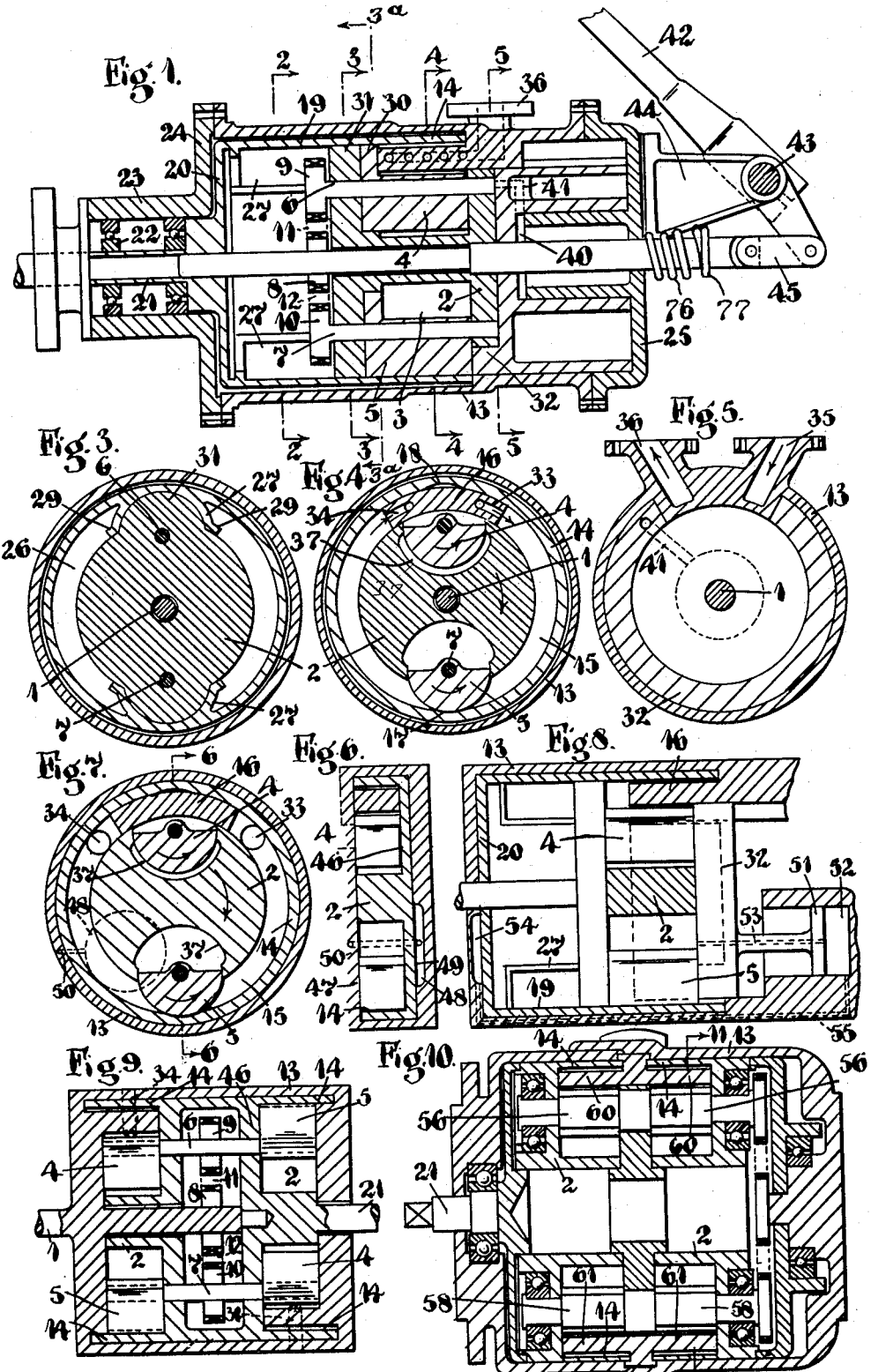

Referring first to the form of the invention illustrated in Figures 1 to 5, the engine shown comprises a non-rotating central shaft 1 freely revoluble upon which is a cylindrical member 2 forming a part of a rotor. In peripheral pockets 3 in the rotor member 2 are a diametrically opposed pair of approximately semi-cylindrical blades 4, 5 disposed with their axes parallel with the shaft 1. These blades, which are respectively mounted upon a pair of shafts 6, 7, having end bearings in the rotor member 2, are rotatable epicyclically with the rotor and perform around their own axes and in a direction the reverse of the direction of rotation of the rotor, one complete revolution relatively to the rotor per revolution of the latter. For this purpose, they are provided with a train of epicyclic gearing comprising a stationary sunwheel 8 fast on the shaft 1, two planet wheels 9, 10 fast on the shafts 6, 7 and a pair of intermediate wheels 11, 12 mounted upon the rotor member 2 and meshing on the one hand with the planet wheels 9, 10 and on the other with the sunwheel 8.

The engine further comprises a cylindrical casing 13 concentric with the shaft 1. This casing (which constitutes a part of the stator of the engine and one of the two relatively rotatable members hereinbefore referred to, the other of these members being constituted by the rotor) surrounds a sleeve 14 which is rotatable in unison with the rotor member 2 and is spaced from the periphery thereof so as to form in conjunction with it an annular blade chamber 15 around which the blades 4, 5 sweep as the rotor revolves, the radially inner surface of the sleeve 14 constituting, therefore, one of the peripheries of the blade chamber while the periphery of the rotor member 2 constitutes the other periphery thereof.

Reaching axially across the upper part of the blade chamber is an abutment 16, which seals along its outer peripheral surface with the inner periphery of the sleeve 14 and along its inner peripheral surface with the periphery of the rotor member 2, with a fine-clearance fit, the two peripheral surfaces of the abutment being for this purpose cylindrical and concentric with the rotor and the sleeve.

As the rotor member 2 revolves, it carries the blades 4, 5 in succession past the abutment 16 with the flat or non-sealing side of the blade towards the abutment and the blade housed entirely within the pocket, and the form and dimensioning of the parts is such that there is at all times an overlap of sealing surfaces as between the abutment and the rotor member 2. For this purpose, the width of the abutment at the periphery of the rotor member 2 is greater than the width of the recesses in the rotor member 2.

The inner periphery of the sleeve 14, or in other words, as will be appreciated, the outer peripheral wall of the blade chamber, is channelled at two points in diametrical alignment with the axes of the blades, with channels 17, 18 which are cylindrical and concentric with the blades and are periodically occupied by the circular or sealing portions of the peripheries of the blades with a fine-clearance sealing fit.

The assembly of parts comprising the rotor member 2, the blades and the timing gearing for the blades is telescopable bodily into and out of a tubular housing 19, which is in effect a continuation of the sleeve 14 and a part of the rotor and is closed at the left-hand end by a wall 20. This wall is fast with a hollow shaft 21 which is mounted in bearings 22 in an axial boss 23 of a part 24 constituting one end-cover of the casing 13. The other end-cover of the casing 13 is marked 25. The casing 13, closed thus at the two ends by the end-covers 24, 25 completely encloses the moving parts of the engine, which may thus run in oil, the parts of the interior of the casing which are sealed off from the blade chamber being, for example, filled with oil.

Integral with the peripheral wall of the housing 19 is an inwardly directed annular flange 26 (see Figure 3). This flange constitutes the left-hand end wall of the blade chamber 15, which, therefore, may be regarded as apertured to accommodate the rotor member 2 and the blades 4, 5, as these telescope into the housing and as the blades in the telescoped position thereof rotate relatively to the rotor. Then, formed integrally with the said peripheral wall of the housing are a pair of approximately semi-cylindrical pockets 27 concentric as regards their inner peripheries with the blades 4, 5. These pockets 27 are formed with marginal lips 29 which effect a sealing fit with the periphery of the rotor member 2 as this telescopes into the housing. The blades 4, 5 are provided at the left-hand end with flanges 30 which complete the cylindrical surface of the blade at the said left-hand end thereof and which effect a sealing fit with the inner peripheries of the pockets 27. In the telescoped position, therefore, of the rotor member 2 and the blades within the housing 19, sealed cavities are in effect provided in the rear of the apertured end wall 26, for the accommodation of the blades during their rotation relatively to the rotor member, the interior of these cavities being open to the interior-proper of the blade chamber through the parts of the aperture in the said end wall which accommodates the blades. If desired, however, filling members for these pockets, complementary to the blades and epicyclically rotatable therewith with the rotor member 2, may be embodied in the engine so as at all times to confine the interior of the blade chamber strictly to the space between the opposed end walls thereof.

The working torque of the engine is transmitted to or from the rotor member 2 through the intermediary of the housing 19 and the pockets 27. To this end, the rotor member 2 is formed at the left-hand end with an oppositely disposed pair of radial projections 31 which are cylindrical and concentric with the pockets 27 and slidingly engage them with a close sealing fit. In this particular embodiment of the invention, therefore, the cavities hereinbefore referred to are sealed partly by the end flanges 30 of the blades and partly by the radial projections 31 of the rotor member 2. If desired, however, the sealing of the cavities may be effected exclusively by one or other of these parts instead of by the two conjointly.

The right-hand end wall of the blade chamber is constituted by a piston-like member 32. This member is fast upon the shaft 1 and is axially movable with it into and out of the blade chamber 15 so as in effect to follow up the rotor member 2 and the blades as these telescope into the housing 19, thereby varying, according to the extent to which the rotor member and the blades are telescoped into the housing past the apertured end wall 26 of the blade chamber, the effective length of the chamber and therefore the capacity of the engine. To this end, the piston 32 effects a sealing sliding fit during its movement into and out of the blade chamber with the peripheral wall thereof (i. e. with the inner periphery of the sleeve 14) and also with the lateral faces of the abutment 16. The rotor member 2 is held up to the piston 32, so as to be drawn back by it out of the housing 19, for example by the axial abutment against it of the sunwheel 8 on the shaft 1.

Any convenient arrangement of inlet and outlet ports leading respectively to and from the interior of the blade chamber 15 may be provided. In the particular embodiment of the invention shown, the inlet and outlet ports lead through the abutment 16 to the said lateral faces thereof. The two port passages in the abutment are marked 33, 34 and they lead from inlet and outlet connections 35, 36 on the stator casing 13.

In the operation of an engine of the above description, the working pressure of the operating fluid in the blade chamber is frequently very considerable. It is desirable, therefore, in order to relieve the blades of radial thrust due to this pressure and thereby the blade bearings in the rotor of one-sided load which might tend to cause excessive frictional heat in the bearings and in course of time excessive wear of the bearings, to provide means for counterbalancing the said radial thrust. To this end, the blade pockets 3 in the rotor member 2 are relieved with annular pressure cavities 37 extending around the pocket from points inset a short distance from the periphery of the rotor member. As the rotor member revolves, these cavities become intermittently placed in communication with the interior of the blade chamber, with the result that the pressure of the operating fluid therein becomes transmitted to what is in effect the back of the blade, and to a certain extent at least, the radial thrust referred to is counterbalanced. If desired, the cavities may be arranged to be in continuous communication with the interior of the blade chamber, for example by connecting them therewith by transfer passages for the operating fluid.

The blade pockets in the rotor member 2, as regards the marginal portions thereof between the periphery of the rotor member and the ends of the pressure cavities 37, are cylindrical and concentric with the blades, and the axes of the blades are positioned at such radial distances from the axis of the rotor member as to ensure that at all times, irrespective of the angular position of the blade in the pocket, there shall be an overlap of sealing surface as between the blade and the pocket.

In this particular embodiment of the invention, therefore, as in certain other embodiments hereinafter described, provision is made for area-sealing everywhere in the engine, whether as between the blades and the blade chamber or as between the blades and the rotor member or again as between the rotor member and the abutment. In the result, an engine of an exceedingly high order of efficiency is provided, even in cases where the operating fluid is a gas or a liquid (for example, water) of relatively low viscosity, and even in cases where the order of fineness of the sealing fit clearances is relatively low.

It should be remarked, with regard to the function of the sleeve 14, that a further purpose of this sleeve, in addition to that of providing, as above described, for area-sealing as between the outer periphery of the blades and the blade chamber, is to effect a virtual extension of the arc of effective sweep of the blades around the blade chamber as compared with the case of line-sealing of the blades with the chamber wall. Thus, whereas with line-sealing, the seal is maintained only so long as the circular sealing surface on the blade is passing a single point of co-tangency with the chamber wall, with the use of a channelled sleeve, rotating in unison with the part of the rotor carrying the blades, the seal is maintained right from the moment the leading edge of the sealing surface on the blade enters the channel at one end thereof to the moment the trailing edge of the said sealing surface leaves the channel at the other end thereof.

In order to counterbalance the axial thrust on the piston 32 from the operating fluid in the blade chamber, a pressure cavity 40 is provided in rear of the piston, between the latter and the end wall 25 of the stator casing, and this cavity 40 is placed in communication with the interior of the blade chamber for the admission of operating fluid therefrom by way of a port passage 41 in the piston.

The means for moving the assemblage of parts comprising the rotor member 2, the blades, the timing gears and the piston 32, axially of the housing 19, to vary as described the effective capacity of the engine, may take any convenient form. In the embodiment of the invention shown, the shaft 1, which at the left hand telescopes into and has a bearing in the end of the hollow shaft 21, is operatively connected to a hand lever 42 pivoted at 43 to a bracket 44 on the stator casing, the said lever 42 being pivotally linked to the end of the shaft 1 by a link 45.

Referring now to the form of the invention illustrated in Figures 6 and 7, the engine according to this form comprises, as before, a rotor member 2, two semi-cylindrical blades 4, 5, a stator casing 13, a rotatable sleeve 14 forming the outer peripheral wall of an annular blade chamber 15, the inner peripheral wall of which is constituted by the periphery of the rotor member 2, an abutment 16 reaching axially into the blade chamber 15 and inlet and outlet ports 33, 34. The sleeve 14 is in rigid unitary connection with the rotor member 2 through the intermediary of a disc 46 constituting the right-hand end wall of the blade chamber. The left-hand end wall is constituted by a part 47 of the stator casing. The end wall 46 will, therefore, be exposed to axial thrust from the operating fluid in the chamber and in order to counterbalance this thrust a pressure cavity 48 is provided in the stator casing to co-operate with a pressure-surface 49 on the back of the wall 46 so as to provide therewith, as in the construction of Figures 1 to 5, a pressure chamber to which operating fluid from the blade chamber may be admitted, for example by way of a transfer duct 50. As shown, this cavity 48 is disposed eccentrically with respect to the blade chamber and to that side of the diametral line through the centre of the abutment which is towards the high pressure side of the chamber. The purpose of this is to provide as far as possible for alignment of the counterbalancing thrust with the thrust to be counterbalanced. This same arrangement may be employed, if desired, in the construction of Figures 1 to 5; that is, instead of disposing the pressure cavity 40 in that construction centrally of the piston 32, it may, if desired, be disposed eccentrically thereof and to that side of the diametral line through the centre of the abutment which is towards the high pressure side of the blade chamber.

Figure 8 illustrates such an arrangement. As shown in this figure, the piston 32 is in unitary connection at the rear with a smaller piston 51 which works in a pressure cylinder 52 incorporated in the stator of the engine and communicating with the interior of the blade chamber, for example by way of a duct 53, and the axis of the piston 51 and cylinder 52 is eccentric to the axis of the blade chamber and situated, as in the construction of Figures 6 and 7, to the side of the diametral line through the centre of the abutment which is towards the high pressure side of the chamber. In this arrangement of Figure 8, moreover, a pressure cavity 54, similar to the pressure cavity 48 of the construction of Figures 6 and 7, is provided in the rear of the end wall 20 of the housing 19, for the purpose of balancing the housing against the axial thrust imposed upon it from the operating fluid in the blade chamber through the intermediary of the left-hand end wall 26 thereof. The cavity 54 communicates with the interior of the blade chamber, for example by way of a conduit 55 leading to the cylinder 52.

The double-chambered engine illustrated in Figure 9 is similar in principle and construction to the engine of Figures 6 and 7. As shown, it is constructed with two oppositely disposed blade chambers formed by annular recesses in a rotor member 2 common to the two chambers and rotatable within a stator member 13 also common to the two chambers. As in the previously described constructions, the outer peripheral walls of the blade chambers are axially channelled to accommodate with a fine-clearance sealing fit the circular sealing surfaces of the blades 4, 5, and since the two blade chambers are in axially opposed relationship to one another, the rotor is inherently balanced axially against end thrust upon its end walls 46 from operating fluid in the blade chambers. The two sets of blades 4, 5 working respectively in the two chambers of the engine are mounted upon common shafts 6, 7 and are driven by a common epicyclic gear train 8, 9, 10, 11, 12, similar to the train above described with reference to Figures 1 to 5.

As shown, the two sets of blades in the respective blade chambers are disposed 180° out of phase with one another for the purpose of obtaining dynamic balance of the rotating parts and the inlet and outlet ports of the engine lead radially into the blade chambers through port apertures in the rotatable sleeves or outer peripheral walls 14 of the chambers instead of axially as in the arrangement of Figures 6 and 7. The porting of the chambers, therefore, is intermittent in this construction, which, as will be appreciated, is an arrangement rather specially adapted to the requirements of, say, an air drill motor, where usually intermittency of supply of the operating fluid to the blade chamber is advantageous. It is to be understood, however, that if desired, the ports in this double-chambered engine may be similarly arranged to those in the previously described constructions. Also, instead of disposing the abutments 180° out of phase with one another, as in the above arrangement, they may, if desired, be disposed in line with one another, an important advantage of this alternative arrangement being that the opposed axial thrusts upon the end walls 46 of the blade chamber, which as above described mutually balance one another and render the rotor inherently balanced axially, are in alignment and in consequence are prevented from setting up a couple tending to impose one-sided radial load upon the rotor bearings. This, as will be appreciated, is a consideration which, generally speaking, is more important in the case of engines of larger sizes and engines designed to operate under heavy working loads.

With regard to the construction shown in Figures 10 and 11, the engine here illustrated is similar in principle to the engine described with reference to Figure 9. There are, however, four blades 56, 57, 58, 59 and two diametrically opposed abutments 60, 61 in each half of the engine, and, in accordance with the invention forming in part the subject matter of copending application Serial No. 88,232 filed June 30, 1936, the blades, rotate around their own axes relatively to the rotor member 2 once per revolution of the latter and are double-sided to correspond with the number of abutments. They are also relatively thin as compared with their diameter, the peripheral length of the channels in the channelled wall of the blade chamber being somewhat greater than the chordal width of the blades at the sealing surfaces thereof in accordance with what has been set forth earlier herein. The two sets of abutments face away from one another instead of towards one another as in the construction of Figure 9, an advantage of this arrangement being that the porting of the chambers is in general facilitated as compared with the arrangement according to Figure 9 and the timing gear for the blades can be disposed, as shown, at one end of the engine instead of at the centre thereof and therefore in a more accessible and generally convenient position.

The above arrangement, according to which the abutments face away from one another, with the timing gear for the blades disposed at one end of the engine, may, if desired, be applied as a modification to the construction shown in Figure 9, that is to say, in the case of a double-chambered engine provided with two blades and a single abutment in each half of the engine, irrespective of whether the abutments be in line with one another or, as in the actual arrangement illustrated in Figure 9, 180° out of phase with one another.

It will be appreciated that this construction, of Figures 10 and 11, is one in which the rotor, that is the rotating unit comprising the two sleeves 14 and the double-ended rotor member 2, is inherently balanced in the engine both radially and axially. It is balanced radially, as regards radial thrust of the operating fluid upon the periphery of the rotor member, by reason of the fact that there are two diametrically opposed high pressure sides in each half of the engine and in addition the rotatable sleeve 14 in each half is in unitary connection with the rotor member 2, and it is balanced axially by reason of the fact that the parts of the rotor member 2 in which the blade shafts have their bearings and which constitute in effect the end walls of the blade chambers are in unitary connection with one another through the intermediary of the central or body portion of the rotor.

The construction described with reference to Figure 9, in the case thereof where the abutments are disposed in axial alignment with one another, is also a construction in which the rotating unit comprising the sleeves 14, the rotor members 2 and the end walls 46, is inherently balanced both radially and axially.

With reference to Figures 12 and 13, the engine shown in these figures is a double-chambered engine similar in certain respects to the engine described with reference to Figures 10 and 11. It comprises at each end, or with respect to each blade chamber, a rotor member 2, a rotatable sleeve 14, two diametrically opposed abutments 60, 61 in axial alignment with one another and four double-sided blades 56, 57, 58, 59, rotatable around their own axes relatively to the rotor member once per revolution of the latter.

It further comprises in respect of each blade chamber means similar to those previously described with reference to Figures 1 to 5 for varying the capacity of the engine. Thus at each end of the engine, there is a tubular housing 19 incorporating sealed pockets 27 which seal with radial projections 31 on the rotor member and with the periphery of the rotor member as the latter is telescoped bodily with the blades into and out of the housing as described above with reference to the said Figures 1 to 5. The two housings 19 are in unitary connection with one another through the intermediary of a rotating shaft 62 with which they are both fast and to or from which the working torque of the engine is transmitted from or to the two rotors through the intermediary of the pockets 27 and projections 31.

In rear of the two rotor members 2 so as to follow them up as they telescope with the blades into the respective housings, are a pair of oppositely directed pistons 63, 64 corresponding each to the piston 32 of the construction of Figures 1 to 5.

These pistons are non-rotatable and are axially slidable with a sealing fit at the periphery along a centre portion 65 of the stator casing 13 from opposite ends of which the two abutments at each end of the engine extend across the blade chamber. They may be slid along the said centre portion 65 so as to move the rotor members 2 and blades into and out of the respective housings simultaneously, by any convenient form of means for this purpose. In the embodiment shown, this means comprises, for example, a double-acting crank 66 on a shaft 67, the crank being interposed between the backs of the two pistons so that when it is turned, by rotation of the shaft 67, it is operable to move the pistons in the one direction or the other according to the direction of rotation of the shaft.

Within each housing 19 is a set of timing gears 70 for the blades of the respective blade chambers. Each of these sets of gears comprises a sunwheel 68, four planet wheels 69 and two intermediate wheels 70, the wheel 68 being fast upon the end of a non-rotating sleeve 71 surrounding the shaft 75

62 and in unitary connection with the respective piston 63 (or 64), the wheels 69 being fast upon the respective blade shafts and the wheels 70 being rotatably mounted upon the end of the rotor member. The same arrangement of wheels may be employed, as shown, in the construction above described with reference to Figures 10 and 11.

With the above arrangement, the two housings are inherently balanced axially against end thrust of the operating fluid in the blade chambers upon the respective end walls 26 thereof, by reason of the fact that the two housings are in unitary connection with one another, as described above; the two pistons 63, 64, constituting the end walls of the blade chambers at the end thereof remote from the said walls 26, are mutually balanced by the provision of an annular pressure chamber 72 intervening between the two pistons and corresponding to the pressure chamber 40 of the construction of Figures 1 to 5; the opposed axial thrusts upon the two housings and also upon the two pistons are in alignment with one another, as in the arrangement of Figures 10 and 11, and the rotor members are balanced radially by reason of the fact that, as in the said arrangement of Figures 10 and 11, there are in effect two diametrically opposed high pressure sides in each half of the engine. In this construction, therefore, the engine is fully balanced, both axially and radially, and this effect is obtained in a double-chambered engine of variable capacity. The pressure chamber 72 may be placed in communication with the interior of one or both of the blade chambers by any convenient means, for example by means of a duct 73 leading to the periphery of one of the pistons 64 and there communicating with an axially disposed groove 74 in one of the abutments 61 so as always to be in communication with this groove and by way thereof with the right-hand blade chamber, irrespective of the position of the piston along the abutment.

With reference to Figure 14, the method of effecting a seal as between the abutment or abutments of the engine and a passing blade which is illustrated in this figure is rather specially suited to the requirements of engines designed to operate with or upon a gaseous operating fluid. As shown, the method consists in providing upon the flat or chordal side of the blade a part-circular or cylindrical rib 75 which is concentric with the blade and sweeps with a sealing fit across the cylindrical face of the abutment, the width of the abutment being such that by the time the rib 75 leaves the said face of the abutment the portion of the periphery of the rotor following the blade will have at least reached the face of the abutment and preferably will have reached a position of overlap therewith.

If desired, instead of employing the construction above described, giving an overlap of sealing surface as between the rotor and the abutment as each blade passes an abutment, line-sealing at this point may be employed, by making the sealing face of the abutment as illustrated in Figure 17, of the same width as the blade pockets therein and disposing the axis of the blade in each case exactly on the chord across the mouth of the pocket. The other construction, however, is preferable, for the reason that it gives a better seal, especially with a gaseous or low-viscosity liquid operating fluid, and for the further reason that with the blades inset somewhat into the pocket to give sealing surface overlap, more space is afforded between the axis of the blade and the abutment for the accommodation of the blade shafts or the equivalent supporting or bearing means for the blades. Also, precision work in the machining of the parts is not so requisite as in the case of line-sealing.

If desired, in the arrangement according to Figures 1 to 5, Figure 8 and Figures 12 and 13, providing for variability of the capacity of the engine, the pressure cavity 40 for counterbalancing the axial thrust upon the piston 32 from the operating fluid in the blade chamber, or such other equivalent part as may be provided for this purpose in the engine, may be utilised as part of a means for effecting an automatic control of the capacity of the engine in accordance with the working load obtaining therein at any given moment, by suitably increasing the effective area of the cavity, that is to say the exposed area therein of the piston 32 or 51, so as to provide an excess of this area over the area of the piston 32 exposed to the interior of the blade chamber, and causing the piston working in the cavity to act against a spring or other controlling thrust element operative to withdraw the rotor member and blades from the housing 19 and thereby to increase the capacity of the engine, with decreasing load upon the operating fluid. By way of example, such a spring is shown in Figure 18, the spring 76 being interposed in compression between the end cover 25 of the stator casing and an abutment flange 77 fast upon the shaft 1. Obviously, however, any other convenient arrangement of spring or equivalent means for the purpose may be employed.

It is to be understood that the invention is not limited to the use of a single abutment with two blades or two abutments with four blades, but is of broad scope in this respect, as inclusive of the use of any desired number of abutments and any desired number of blades. For example, with a two-abutment engine, three double-sided blades may quite conveniently be employed instead of four.

It is further to be understood that the invention includes the use of any desired arrangement of abutments and blades, in respect of the number of the abutments and the number and form of the blades, either with means for varying the capacity of the engine or without such means, and with any form and disposition of the abutments in the axial section of the engine, that is to say, for example, in the case of a double-chambered engine, with the abutments either axially in line with one another, as in Figures 10 and 11 and Figures 12 and 13 or, in the case of a single-abutment arrangement, staggered, as in Figure 9, or again, with the abutments of the respective chambers either directed towards one another, as in Figure 9 or away from one another, as in Figures 10 and 11 and Figures 12 and 13.

It is also to be understood that the invention is not limited to engines with two chambers as in the specific embodiments of Figure 9, Figures 10 and 11 and Figures 12 and 13, but includes the employment in a plural-chambered engine of any desired number of chambers.

In this connection, it may be remarked that a plural-chambered engine in accordance with this invention may if desired, be designed as a multi-stage unit, for example, a multi-stage pump, motor or compressor, by suitably proportioning the volumetric capacities of the respective blade chambers and arranging that the operating fluid passes through the two or more chambers of the engine in succession.

Referring now to Figures 15 and 16, with the arrangement shown in these figures, the motor A may be driven either in the forward direction or in the reverse direction or not at all, without cessation of operation of the pump B, according to the relative positions of the various parts of the valve gear. The operation of the valve gear is as follows.

78, 79 are conduits leading respectively from the inlet and outlet sides of the pump B and 80, 81 are similar conduits leading respectively from the outlet and inlet sides of the motor A. 82 is a valve cheek opposed to a similar valve cheek 83 and 84 is a valve plate interposed between the two valve cheeks and angularly adjustable therebetween. 85, 86 are two ports in the valve cheek 83, communicating respectively with two branches 87, 88 from the conduit 79. 89, 90 are two similar ports communicating respectively with branches 91, 92 from the conduit 78. 93, 94 are two ports in the other valve cheek 82 communicating respectively with two branches 95, 96 from the conduit 81 and 97, 98 are two other ports communicating respectively with branches 99, 100 from the conduit 80. 101, 102, 103, 104 are respectively four ports in the valve plate 84. These ports are of elongated form, as also are the ports 93, 94, 97, 98 and they are disposed upon a pitch circle coincident with the pitch circle of the ports in the valve cheeks 82, 83. Their relative disposition in relation to these ports is such that, according to the angular position of the valve plate, the following sequence of different courses for the operating fluid through the valve are possible, giving respectively the forward, the reverse and the neutral condition of drive as between the pump and the motor of the transmission unit:—

Assume the motor is to operate in the forward direction. Valve plate 84 is adjusted to the forward position. In this position the valve plate covers the ports 86 and 89 and opens ports 85 and 90. Operating fluid therefore will flow from the pump through conduit 79, branch 87, port 85, port 101, branch 95, conduit 81, through the motor of the transmission unit, through conduit 80, branch 100, port 98, port 104, port 90, branch 92, conduit 78 and back to the inlet of the pump.

Assume now the motor is to operate in the reverse direction. Valve plate 84 is adjusted to reverse position. In this position, it covers ports 85, 90 and opens ports 86, 89. Operating fluid will flow, therefore, from the pump through conduit 79, port 86, port 102, port 97, conduit 80, through the motor of the unit, through conduit 81, port 94, port 103, port 89 and back to the pump via branch 91 and inlet conduit 78.

If now the valve plate be moved to neutral position (the position shown in Figure 16), all four ports 85, 86, 89, 90 are open. In consequence, the operating fluid from the pump will flow either along branch conduit 87, through ports 85, 101, 103, along branch conduits 95, 96, through ports 94, 103, 89 and along branch conduit 91 and conduit 78 back to the pump, the valve gear thus short-circuiting the motor; or along the course parallel to this, namely 88, 86, 102, 97, 99, 100, 98, 104, 90, 92.

It is to be understood that the various features of the engine in accordance with this invention, including in addition to the principal feature of a channelled outer periphery to the blade chamber rotatable in unison with the pocketed inner periphery, and sealing with the blades as these sweep round the chamber, the feature of double-sided blades in a plural-abutment engine, the feature of variability of the capacity of the blade chamber and the feature of balancing the moving parts of the engine against thrust from the operating fluid in the blade chamber, may be employed in either the pump or the motor of the transmission unit or in both. Thus, advantageously one or both of the engines of the unit, for example the pump element thereof, may be of the construction providing for variability of the axial length of the blade chamber of the engine and thereby the capacity of the engine, the unit being constituted accordingly a variable speed fluid gear; in which event the variable capacity engine may also incorporate the means described for automatically controlling the variation of the capacity of the engine and thereby the ratio of the fluid gear, in accordance with the working load obtaining in the blade chamber. Such an arrangement may be employed, for instance, in the case of the power transmission unit of a motor-driven vehicle.

Finally, it will be apparent from the foregoing description of the invention, that the parts of the engine hereinbefore referred to and which will be referred to also in the following statement of claim, as concentric relatively rotatable members are not necessarily of a unitary or one-piece construction, but may, as in certain of the specific embodiments of the invention illustrated in the drawings, be of a composite nature, built up of several parts, which, however, are all in stationary relationship to one another in the sense indicated above, that is, so as to be either rotatable in unison or as one about the rotational axis of the engine, in the case of the rotor element thereof, or stationary as one, in the case of the stator element. Also the expression fixed abutments is used in the sense that the abutments are in stationary relation to the member carrying them in contrast to arrangements employing rotary or otherwise movable abutments.

What I claim as my invention and desire to secure by Letters Patent of the United States is:

1. A rotary engine including in combination an annular blade chamber lying between inner and outer circumferential walls which are rotatable as a unit, blade recesses of part-circular cross-section provided in the inner circumferential wall, blades of part-circular cross-section mounted to rotate in said blade recesses and so formed that during part of the rotation of said blades they lie wholly in the recesses whereas at other times they extend across the blade chamber to engage channels of part-circular cross-section provided in the outer circumferential wall, each blade, the blade recess therefor, and the channel engaged thereby having their part-circular cross-sections coaxial and of the same radius of curvature, at least one stationary abutment extending across the blade chamber between stationary inlet and outlet ports, and means for causing the blades to rotate continuously in their recesses during rotation of the inner and outer circumferential walls, each blade extending across the blade chamber so as to make a sealing fit with its blade recess and its channel as it passes through the part of the blade chamber not occupied by an abutment but receding wholly into the blade recess when necessary to permit such passage.

2. A rotary engine including in combination an annular blade chamber lying between inner and outer circumferential walls which are rotatable as a unit, blade recesses of part-circular cross-section provided in the inner circumferential wall, blades of part-circular cross-section mounted to rotate in said blade recesses and so formed that during part of the rotation of said blades they lie wholly in the recesses whereas at other times they extend across the blade chamber to engage channels of part-circular cross-section provided in the outer circumferential wall, each blade, the blade recess therefor, and the channel engaged thereby having their part-circular cross-sections coaxial and of the same radius of curvature, at least one stationary abutment extending across the blade chamber between stationary inlet and outlet ports, and means for causing the blades to rotate continuously in their recesses during rotation of the inner and outer circumferential walls, each blade extending across the blade chamber so as to make a sealing fit with its blade recess and its channel as it passes through the part of the blade chamber not occupied by an abutment but receding wholly into the blade recess when necessary to permit such passage, the length of each abutment measured circumferentially being greater than the corresponding dimension of the opening through which each blade recess opens into the blade chamber so that the abutment engages parts of the inner circumferential surface of the blade chamber on both sides of the recess as such recess passes the abutment.

3. A rotary engine including in combination an annular blade chamber lying between inner and outer circumferential walls which are rotatable as a unit, blade recesses of part-circular cross-section provided in the inner circumferential wall, blades of part-circular cross-section mounted to rotate in said blade recesses and so formed that during part of the rotation of said blades they lie wholly in the recesses whereas at other times they extend across the blade chamber to engage channels of part-circular cross-section provided in the outer circumferential wall, each blade, the blade recess therefor, and the channel engaged thereby having their part-circular cross-sections coaxial and of the same radius of curvature, at least one stationary abutment extending across the blade chamber between stationary inlet and outlet ports, bearings supporting the blades within the recesses to maintain a fine-clearance sealing fit between the blade and its recess and channel, and means for causing the blades to rotate continuously in their recesses during rotation of the inner and outer circumferential walls, each blade extending across the blade chamber so as to make a sealing fit with its blade recess and its channel as it passes through the part of the blade chamber not occupied by an abutment but receding wholly into the blade recess when necessary to permit such passage.

4. A rotary engine including in combination an annular blade chamber the inner and outer circumferential walls of which rotate as a unit with one end wall while the other end wall is stationary, at least one abutment extending across the blade chamber from the stationary end wall between stationary inlet and outlet ports, blade recesses of part-circular cross-section provided in the inner circumferential wall, blades of part-circular cross-section mounted to rotate in said blade recesses and so formed that during part of the rotation of said blades they lie wholly in the recesses whereas at other times they extend across the blade chamber to engage channels of part-circular cross-section provided in the outer circumferential wall, each blade, the blade recess therefor, and the channel engaged thereby having their part-circular cross-sections coaxial and of the same radius of curvature, and means for causing the blades to rotate continuously in their recesses during rotation of the inner and outer circumferential walls, each blade extending across the blade chamber so as to make a seal with its recess and its cooperating channel as it passes through the part of the blade chamber not occupied by an abutment but receding wholly into its recess when necessary to permit such passage.

5. A rotary engine comprising two coaxial axially displaced annular blade chambers each having inner and outer circumferential walls which are rotatable, an end wall with which said inner and outer circumferential walls rotate as a unit and another end wall which is stationary, at least one stationary abutment extending across each blade chamber between stationary inlet and outlet ports, blade recesses of part-circular cross-section provided in the inner circumferential wall of each blade chamber, blades of part-circular cross-section mounted to rotate in the recesses and so formed that during part of their rotation they lie wholly in the recesses whereas at other times they extend across the blade chamber to engage channels of part-circular cross-section provided in the outer circumferential wall, each blade, the blade recess therefor, and the channel engaged thereby having their part-circular cross-sections coaxial and of the same radius of curvature, and means for causing the blades to rotate continuously in their recesses during rotation of the inner and outer circumferential walls, each blade extending across the blade chamber so as to make a sealing fit with its blade recess and its channel as it passes through the part of the blade chamber not occupied by an abutment but receding wholly into the blade recess when necessary to permit such passage, the rotatable end walls of the two blade chambers being rigidly connected together.

6. A rotary engine comprising two coaxial axially displaced annular blade chambers each having inner and outer circumferential walls which are rotatable, an end wall with which said inner and outer circumferential walls are rotatable as a unit, and a stationary end wall, at least one stationary abutment extending across each blade chamber between stationary inlet and outlet ports, blade recesses of part-circular cross-section provided in the inner circumferential wall of each blade chamber, blades of part-circular cross-section mounted to rotate in the recesses and so formed that during part of their rotation they lie wholly in the recesses whereas at other times they extend across the blade chamber to engage channels of part-circular cross-section provided in the outer circumferential wall, each blade, the blade recess therefor, and the channel engaged thereby having their part-circular cross-sections coaxial and of the same radius of curvature, and means for causing the blades to rotate continuously in their recesses during rotation of the inner and outer circumferential walls, each blade extending across the blade chamber so as to make a sealing fit with its blade recess and its channel as it passes through the part of the blade chamber not occupied by an abutment but receding wholly into the blade recess when necessary to permit such passage, the rotatable end walls of the two blade chambers being rigidly connected together and each blade in one chamber being rigidly connected to a corresponding blade in the other chamber.

7. A rotary engine including in combination an annular blade chamber having inner and outer circumferential walls which are rotatable as a unit, at least two stationary abutments equally spaced circumferentially around the blade chamber and each extending across the blade chamber between stationary inlet and outlet ports, twice as many blade recesses of part-circular cross-section provided in the inner circumferential wall of the blade chamber as there are stationary abutments, blades of part-circular cross-section mounted to rotate in the recesses and so formed that during part of their rotation they lie wholly in the recesses whereas at other times they extend across the blade chamber to engage channels of part-circular cross-section provided in the outer circumferential wall, each blade, the blade recess therefor, and the channel engaged thereby having their part-circular cross-sections coaxial and of the same radius of curvature, and means for causing the blades to rotate continuously in their recesses during rotation of the circumferential walls, each blade extending across the blade chamber so as to make a sealing fit with its recess and its channel as it passes through the parts of the blade chamber not occupied by abutments but receding wholly into its recess when necessary to permit such passage.

8. A rotary engine including in combination an annular blade chamber having inner and outer circumferential walls which are rotatable as a unit, at least two stationary abutments equally spaced circumferentially around the blade chamber and each extending across the blade chamber between stationary inlet and outlet ports, twice as many recesses of part-circular cross-section provided in the inner circumferential wall of the blade chamber as there are stationary abutments, blades of part-circular cross-section mounted to rotate in the recesses and so formed with two part-circular surfaces separated by non-circular parts that twice during each revolution each blade lies wholly in its recess whereas at other times it extends across the blade chamber to engage a channel of part-circular cross-section provided in the outer circumferential wall, each blade, the blade recess therefor, and the channel engaged thereby having their part-circular cross-sections coaxial and of the same radius of curvature, and means for causing the blades to rotate continuously in their recesses so that each blade performs one complete revolution in its recess for each complete revolution of the circumferential walls whereby each blade extends across the blade chamber so as to make a sealing fit with its recess and its channel as it passes through the parts of the blade chamber not occupied by the abutments but recedes wholly into its recess when necessary to permit such passage.

9. A rotary engine as claimed in claim 2, in which the axial force exerted by the fluid pressure within the blade chamber on an end wall is at least partially counterbalanced by fluid pressure derived from the blade chamber and acting on the outer face of the said end wall.

10. A rotary engine as claimed in claim 1, in which part of the surface of each blade recess is cut away to form a fluid pressure chamber the pressure in which thus acts radially outwards on the blade partly or wholly to counterbalance the inward radial force exerted on the blade by the pressure in the blade chamber, the fluid pressure chamber having direct communication with the corresponding blade recess only.

11. A rotary engine including in combination an annular blade chamber lying between inner and outer circumferential walls which are rotatable as a unit and two end walls, of which one is rotationally fixed and the other is rotary with the circumferential walls, blade recesses of part-circular cross-section provided in the inner circumferential wall, blades of part-circular cross-section mounted to rotate in these recesses and so formed that during part of the rotation of said blades they lie wholly in the recesses whereas at other times they extend across the blade chamber to engage channels of part-circular cross-section provided in the outer circumferential wall, each blade, the blade recess therefor and the channel engaged thereby having their part-circular cross-sections coaxial and of the same radius of curvature, at least one stationary abutment extending across the blade chamber between stationary inlet and outlet ports, means for causing the blades to rotate continuously in their recesses during rotation of the inner and outer circumferential walls, each blade extending across the blade chamber so as to make a sealing fit with its blade recess and its channel as it passes through the part of the blade chamber not occupied by an abutment but receding wholly into the blade recess when necessary to permit such passage, means for moving the rotationally fixed end wall axially with the blades relatively to the abutment, and pockets into which the blades can then recede through apertures in the rotary end wall to vary the capacity of the engine.

12. A rotary engine including in combination an annular blade chamber lying between inner and outer circumferential walls which are rotatable as a unit and two end walls, of which one is rotationally fixed and the other is rotary with the circumferential walls, blade recesses of part-circular cross-section provided in the inner circumferential wall, blades of part-circular cross-section mounted to rotate in these recesses and so formed that during part of the rotation of said blades they lie wholly in the recesses whereas at other times they extend across the blade chamber to engage channels of part-circular cross-section provided in the outer circumferential wall, at least one stationary abutment extending across the blade chamber between stationary inlet and outlet ports, each blade, the blade recess therefor, and the channel engaged thereby having their part-circular cross-sections coaxial and of the same radius of curvature, means for causing the blades to rotate continuously in their recesses during rotation of the inner and outer circumferential walls, each blade extending across the blade chamber so as to make a sealing fit with its blade recess and its channel as it passes through the part of the blade chamber not occupied by an abutment but receding wholly into the blade recess when necessary to permit such passage, the length of each abutment measured circumferentially being greater than the corresponding dimension of the opening through which each blade recess opens into the blade chamber so that the abutment engages parts of the inner circumferential surface of the blade chamber on both sides of each recess as such recess passes the abutment, means for moving the rotationally fixed end wall axially with the blades relatively to the abutment, and pockets into which the blades can then recede through apertures in the rotary end wall to vary the capacity of the engine.

13. A rotary engine as claimed in claim 11, in which the inner circumferential wall of the blade chamber moves axially with the rotationally fixed end wall and moves with the blades through an aperture in the rotating end wall.

14. A rotary engine as claimed in claim 11, in which each pocket into which a blade moves axially is provided with an end wall formed to move axially with the blades and there are walls which rotate with the rotary end wall and make a fluid tight seal with the end wall of each pocket and which together constitute the outer circumferential wall of the pocket.

15. A rotary engine as claimed in claim 11, in which means are provided for applying to the outer face of the rotationally stationary end wall fluid pressure derived from the blade chamber so as to oppose the axial pressure exerted on this end wall by the fluid pressure within the blade chamber.

16. A rotary engine as claimed in claim 11, in which means are provided for applying to the outer face of the rotationally stationary end wall fluid pressure derived from the blade chamber so as to apply thereto an axial force which is greater than the axial force exerted thereon by the pressure within the blade chamber, and a spring resisting movement of the rotationally stationary end wall under the action of the pressure applied to its outer face.

17. A rotary engine including in combination an annular blade chamber the inner circumferential wall of which is rotatable, at least two stationary abutments equally spaced circumferentially around the blade chamber and each extending across the blade chamber between stationary inlet and outlet ports, twice as many blade recesses of part-circular cross-section provided in the inner circumferential wall of the blade chamber as there are stationary abutments, blades of part-circular cross-section mounted to rotate in the recesses and so formed with two part-circular surfaces separated by non-circular surfaces that twice during each revolution each blade lies wholly in its recess whereas at other times it extends across the blade chamber to lie against the outer circumferential wall, and means for causing the blades to rotate continuously in their recesses so that each blade performs one complete revolution in its recess for each complete revolution of the inner circumferential wall whereby each blade extends across the blade chamber to make a sealing fit with the outer circumferential wall as it passes through the parts of the blade chamber not occupied by abutments but recedes wholly into its recess when necessary to permit such passage.

18. A rotary engine including in combination an annular blade chamber the inner and outer circumferential walls of which are rotatable as a unit, at least two stationary abutments equally spaced circumferentially around the blade chamber and each extending across the blade chamber between stationary inlet and outlet ports, twice as many blade recesses of part-circular cross-section provided in the inner circumferential wall of the blade chamber as there are stationary abutments, blades of part-circular cross-section mounted to rotate in the recesses and so formed that during part of their rotation they lie wholly in the recesses whereas at other times they extend across the blade chamber to make a sealing fit with the outer circumferential wall, and means for causing the blades to rotate continuously in their recesses during rotation of the circumferential walls, each blade extending across the blade chamber so as to make a sealing fit with its recess and the outer circumferential wall as it passes through the parts of the blade chamber not occupied by abutments but receding wholly into its recess when necessary to permit such passage.

19. A rotary engine including in combination an annular blade chamber lying between inner and outer circumferential walls, at least the inner circumferential wall being rotatable, blade recesses of part-circular cross-section provided in the inner circumferential wall, blades of part-circular cross-section mounted to rotate in these recesses and so formed that during part of their rotation they lie wholly in the recesses whereas at other times they extend across the blade chamber to make a sealing fit with the outer circumferential wall, at least one stationary abutment extending across the blade chamber between stationary inlet and outlet ports, and means for causing the blades to rotate continuously in their recesses during rotation of the inner wall, each blade extending across the blade chamber so as to make a sealing fit with the outer circumferential wall as it passes through the part of the blade chamber not occupied by an abutment but receding wholly into the blade recess when necessary to permit such passage, part of the surface of each blade recess being cut away to form a fluid pressure chamber the pressure in which acts radially outwards on the blade partly or wholly to counterbalance the inward radial force exerted on the blade by the pressure in the blade chamber, the fluid pressure chamber having direct communication with the corresponding blade recess only.

20. A rotary engine including in combination an annular blade chamber lying between inner and outer circumferential walls and between a rotatable end wall and a rotationally stationary end wall, the inner circumferential wall being rotatable with the rotatable end wall, blade recesses of part-circular cross-section provided in the inner circumferential wall, blades of part-circular cross-section mounted to rotate in these recesses and so formed that during part of their rotation they lie wholly in the recesses whereas at other times they extend across the blade chamber to make a sealing fit with the outer circumferential wall, at least one stationary abutment extending across the blade chamber between stationary inlet and outlet ports, means for causing the blades to rotate continuously in their recesses during rotation of the inner circumferential wall, each blade extending across the blade chamber so as to make a sealing fit with its blade recess and the outer circumferential wall as it passes through the part of the blade chamber not occupied by an abutment but receding wholly into the blade recess when necessary to permit such passage, means for moving the rotationally fixed end wall axially with the blades relatively to the abutment, and pockets into which the blades can then recede through apertures in the rotary end wall to vary the capacity of the engine.

21. A rotary engine as claimed in claim 20, in which the inner circumferential wall of the blade chamber moves axially with the rotationally fixed end wall and the blades through an aperture provided in the rotating end wall.

22. A rotary engine as claimed in claim 20, in which means are provided for applying to the outer face of the rotationally stationary end wall fluid pressure derived from the blade chamber so as to counteract at least partially the axial pressure exerted on this end wall by the fluid pressure within the blade chamber.

23. A rotary engine as claimed in claim 20, in which means are provided for applying to the outer face of the rotationally stationary end wall fluid pressure derived from the blade chamber so as to apply thereto an axial force which is greater than the axial force exerted thereon by the pressure within the blade chamber, and a spring resisting movement of the rotationally stationary end wall under the action of the pressure applied to its outer face.

MELVILLE BERTRAM BOOTH